June 15, 1937.   O. L. ROBERTS   2,083,578
FILTER CAKE WASHING
Filed Sept. 25, 1934
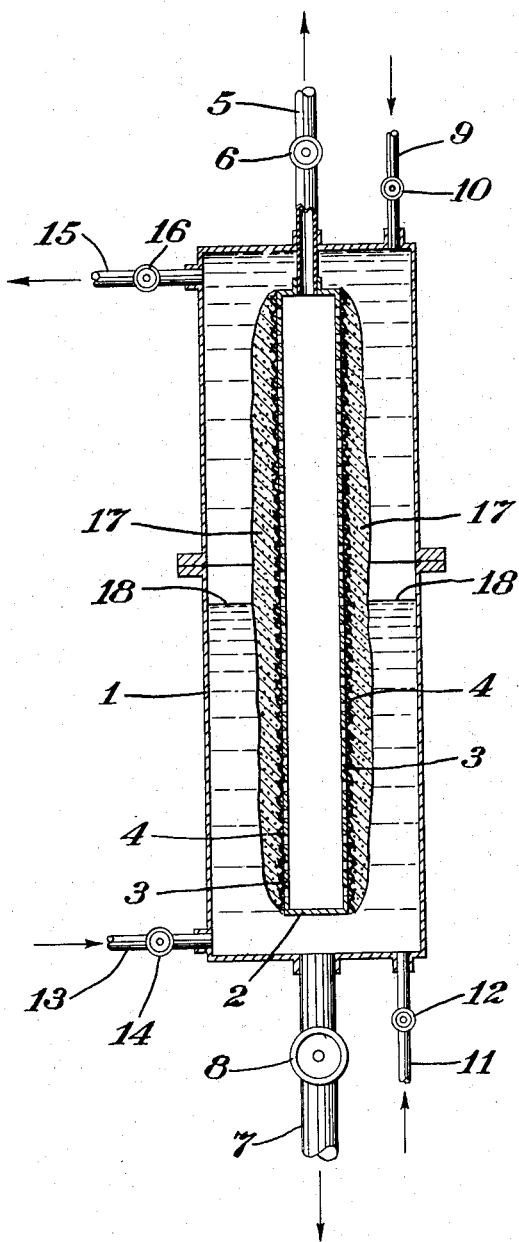
Inventor
Oscar L. Roberts
By T. Wallace Grimm
his Attorney Patented June 15, 1937

2,083,578

UNITED STATES PATENT OFFICE 2,083,578

FILTER CAKE WASHING

Oscar L. Roberts, Merwood, Pa., assignor to The Atlantic Refining Company, Philadelphia, Pa., a corporation of Pennsylvania Application September 25, 1934, Serial No. 745,383

3 Claims. (Cl. 210—182)

The present invention relates to a method for filtering or separating solids from liquids and more particularly to the washing or extraction of filter press cakes with a solvent liquid to remove miscible constituents therefrom.

My invention is particularly applicable to the removal of liquid constituents from press cakes, for example, the removal of oil from wax cakes produced in the filtration of hydrocarbon oil-wax mixtures.

In the separation of paraffin wax from hydrocarbon oils, such as petroleum lubricating oils, it is common practice to filter the oil-wax mixture under pressure, with or without dilution with a low viscosity solvent. The wax cake obtained by such filtration process usually contains considerable quantities of oil, i. e., on the order of 50% or more by weight of the cake. In some instances the cake may be washed with a solvent liquid, preferably a liquid completely miscible with the oil at the temperature of washing, whereby the oil content of the cake may be reduced. However, in general, the washing of the press cake is not complete, the oil content of the cake being of the order of 25% by weight.

The practice of washing wax cakes is confined primarily to filters of the suction leaf type in which the cakes are built up on the outer surface of the press leaves. In accordance with the conventional method of washing wax cakes in this type of filter, the unfiltered wax slurry is forced from the press casing by gas pressure, after a cake of the proper size has been deposited on the filter leaves, and sufficient gas pressure is maintained on the cake to prevent the same from breaking loose and dropping from the leaves. In many instances, sufficient gas pressure is applied to the press cake to force a portion of the oil contained therein completely through and out of said cake. When the unfiltered slurry has been removed from the press casing, wash solvent is passed into the casing, thereby displacing the gas and completely submerging the wax cake. The wash solvent is then forced through the cake, under substantial pressure, and a portion of the oil contained therein is thus removed.

When operating in accordance with the prior practice, the results obtained are, in general, unsatisfactory, inasmuch as the oil content of the washed cake is usually upwards of 25% by weight. The high oil content of the press cake may be attributed to the incomplete washing of the cake, which is usually non-uniform in structure. This non-uniformity generally results from the uneven size and distribution of the wax crystals upon the press leaves and is further aggravated by the employment of gas pressure to hold the cake in place or to force a portion of the contained oil from the cake. I have found that if the unfiltered slurry is drained from the press casing and the cake is subjected to gas pressure, cracks or channels will develop within the cake, thereby permitting passage of wash solvent through the path of least resistance, i. e., the channels, upon subsequent washing of the cake with a solvent liquid.

In order to overcome this difficulty I propose to effect washing of the wax cake in such a manner that the cake is at all times completely submerged in liquid and that the quantity of wash solvent required for a thorough washing of the cake is reduced to a minimum.

Briefly, my method comprises passing a wax slurry, prepared from a wax-containing oil stock, either as such or in dilution in a suitable solvent, into a filter press of the stationary or rotary leaf type, building up a wax cake of desired thickness upon the press leaves and then displacing any unfiltered slurry from the press casing by means of a wash solvent in such a manner that a substantially uniform interface is maintained between the wash solvent being introduced and the slurry being drained out, and finally, after the removal of the slurry, applying sufficient pressure to force the relatively uncontaminated wash solvent through the wax cake. In employing a wash solvent of lower specific gravity than that of the liquid portion of the unfiltered wax slurry, such wash solvent is preferably introduced above the liquid level of the slurry in the casing, and displacement of the latter from the casing is effected downwardly without substantial intermixing of the wash solvent with the slurry. On the other hand, if the wash solvent has a specific gravity greater than that of the liquid portion of the unfiltered slurry, such wash solvent is preferably introduced at the bottom of the press casing, and the slurry is displaced upwardly and out of the casing without substantial intermixing.

For a further understanding of my invention reference is made to the accompanying drawing which illustrates, in cross section, apparatus suitable for carrying on my process.

The filter casing 1 is provided with a cell 2 having perforated side plates 3 covered with a filtering medium such as canvas 4. The upper end of cell 2 is connected to the filtrate outlet pipe 5 controlled by valve 6. The filter casing 1 is further provided with a wax discharge pipe 7 controlled by valve 8, wash solvent inlet pipes 9 and 11 controlled by valves 10 and 12 respectively, slurry inlet pipe 13 controlled by valve 14 and slurry discharge pipe 15 controlled by valve 16.

Exemplary of operation, in accordance with my invention, is the following: the filter casing 1 is filled with wax slurry introduced through pipe 13, valves 6, 8, 10 and 12 being closed and valve 16 being open as a vent. When the casing 1 has been filled, valve 6 is opened and valve 16 closed, suction is then applied to filtrate outlet pipe 5, and the solid constituent of the slurry, i. e., the wax is deposited upon the canvas covered plates 3, while the oil or oil solution passes through the perforated plates to the interior of the cell 2 and is withdrawn through outlet pipe 5, fresh slurry being continuously supplied to the casing 1.

When the wax cakes 17 have been built up to the desired thickness, the slurry supply is shut off by means of valve 14 and the valve 6 of filtrate outlet pipe 5 is preferably adjusted to permit only a very small flow therethrough. The step of cake-washing is then commenced. Assuming, in this instance, that the specific gravity of the wash solvent is lower than that of the liquid portion of the unfiltered slurry remaining in the casing 1, valves 10 and 8 are opened and wash solvent is introduced into the filter casing through pipe 9, while unfiltered slurry is drawn from the bottom of the casing through pipe 7. The displacement of the slurry by the wash solvent is effected in such a manner that a substantially uniform or undisturbed interface is maintained between the two liquids and the wax cakes are completely submerged in liquid during this operation. At the same time a sufficient differential pressure is maintained between the surface of the wax cake 17 and the interior of cell 2 to hold the wax cake undisturbed and in place. For purposes of illustration this interface is indicated by the line 18.

When substantially all of the unfiltered slurry has been displaced from the filter casing 1, valve 8 is closed and valve 6 is opened to permit substantial flow therethrough. The relatively fresh or uncontaminated wash solvent is drawn through the cake 17 to wash the contained oil therefrom and such wash solvent is withdrawn from the interior of cell 2 by means of outlet pipe 5. After the wax cakes 17 have been washed to the desired degree, the wash solvent supply is shut off by means of valve 10 and the solvent remaining in the filter casing may be withdrawn therefrom through pipe 7. The washed cakes may then be removed from the filter canvas by conventional means, for example, by high pressure liquid sprays (not shown) directed against the cakes to break the same loose from the canvas, and the disintegrated wax may then be withdrawn from the casing through pipe 7.

If the specific gravity of the wash solvent employed is greater than that of the wax slurry, such solvent would be introduced at the bottom of the filter casing 1 by means of pipe 11. Uniform displacement of the unfiltered slurry would take place upwardly, such slurry being withdrawn from the top of the casing 1 through pipe 15. The washing operation would then be carried on substantially as above described.

While I have illustrated my invention in connection with a filter unit provided with only one stationary cell, I do not intend to limit myself thereto but may apply my process to the washing of filter cakes in presses containing a plurality of stationary or rotary cells or leaves.

In accordance with my invention I am able to obtain a very thorough washing of the oil from the wax cake by maintaining the cake constantly submerged in liquid, thereby preventing the formation of cracks or channels within the cake which would permit by-passing of the wash solvent through portions of the cake. Furthermore, by displacing the unfiltered slurry from the press casing without substantial admixing with the wash solvent, I prevent contamination of the latter with slurry and I am therefore able to effect a degree of washing with a small quantity of solvent as heretofore has been obtained only with much larger quantities of the solvent when same was permitted to become mixed with the slurry. For example, the quantity of unfiltered wax slurry remaining in the casing of a conventional suction rotary leaf filter, at the completion of the filtering cycle, may be of the order of from 35 to 45 barrels. In order to obtain a thorough washing of the wax cake with the minimum quantity of wash solvent, such unfiltered slurry must be removed from the press casing without substantial admixture thereof with the wash solvent being introduced, and without permitting the cake to emerge from the liquid.

It will be understood that when my invention is applied to a movable leaf filter, as for example, of the rotary leaf type, the leaves of such filter, preferably, are kept stationary during the displacement of slurry by wash liquid.

My process is not confined to the employment of any particular diluent or wash solvent, but may be applied in any filter pressing operation involving the separation of oil from wax, and particularly when solvents such as propane, butane, ethylene dichloride, acetone-benzol and similar agents are employed.

For brevity, in the appended claims, the term "wash liquid" is to be understood to comprehend a liquid which at the temperature of separation, is miscible with the liquid constituents, but relatively immiscible with the solid constituents of the mixture to be separated.

What I claim is:

1. In a process for separating solid wax from a mixture comprising liquid oil and solid wax, the steps which comprise continuously passing said mixture into a filtering zone, passing oil from said filtering zone through a filter medium while depositing thereon a filter cake of wax containing oil, discontinuing the passage of said mixture into the filtering zone, withdrawing from said zone the unfiltered mixture surrounding said wax cake, introducing into said zone a wash liquid of a specific gravity different from that of said mixture at a locus such that the liquid of greater specific gravity underlies that of lesser specific gravity and at a rate corresponding substantially to the rate of withdrawal of the unfiltered mixture, thereby to displace said unfiltered mixture and to maintain a substantially uniform interface between said wash liquid and said unfiltered mixture, said wax cake being maintained substantially completely submerged in liquid throughout the displacement operation, and passing at least a portion of said wash liquid through said filter cake to wash therefrom the oil contained therein.

2. In a process for separating solid wax from a mixture comprising liquid oil and solid wax, the steps which comprise continuously passing said mixture into a filtering zone, passing oil from said filtering zone through a filter medium while depositing thereon a filter cake of wax containing oil, discontinuing the passage of said mixture into the filtering zone, withdrawing from said zone the unfiltered mixture surrounding said wax cake, introducing into said zone a wash liquid of a specific gravity different from that of said mixture at a locus such that the liquid of greater specific gravity underlies that of lesser specific gravity and at a rate corresponding substantially to the rate of withdrawal of the unfiltered mixture, thereby to displace said unfiltered mixture and to maintain a substantially uniform interface between said wash liquid and said unfiltered mixture, said wax cake being maintained substantially completely submerged in liquid throughout the displacement operation, and, upon substantially complete removal of said unfiltered mixture from the filtering zone, passing at least a portion of said wash liquid through said filter cake to wash therefrom the oil contained therein.

3. In a process for separating solid wax from a mixture comprising liquid oil and solid wax, the steps which comprise continuously passing said mixture into a filtering zone, passing oil from said filtering zone through a filter medium while depositing thereon a filter cake of wax containing oil, discontinuing the passage of said mixture into the filtering zone, throttling the passage of liquid through the filter medium, withdrawing from said zone the unfiltered mixture surrounding said wax cake, introducing into said zone a wash liquid of a specific gravity different from that of said mixture at a locus such that the liquid of greater specific gravity underlies that of lesser specific gravity and at a rate corresponding substantially to the rate of withdrawal of the unfiltered mixture, thereby to displace said unfiltered mixture and to maintain a substantially uniform interface between said wash liquid and said unfiltered mixture, said wax cake being maintained substantially completely submerged in liquid throughout the displacement operation, and subsequently passing at least a portion of said wash liquid through said filter cake to wash therefrom the oil contained therein.

OSCAR L. ROBERTS.